Dec. 10, 1946.  C. POLLAK  2,412,288
APPARATUS FOR MAKING MONTAGE PRINTS
Filed Aug. 6, 1945  2 Sheets-Sheet 1
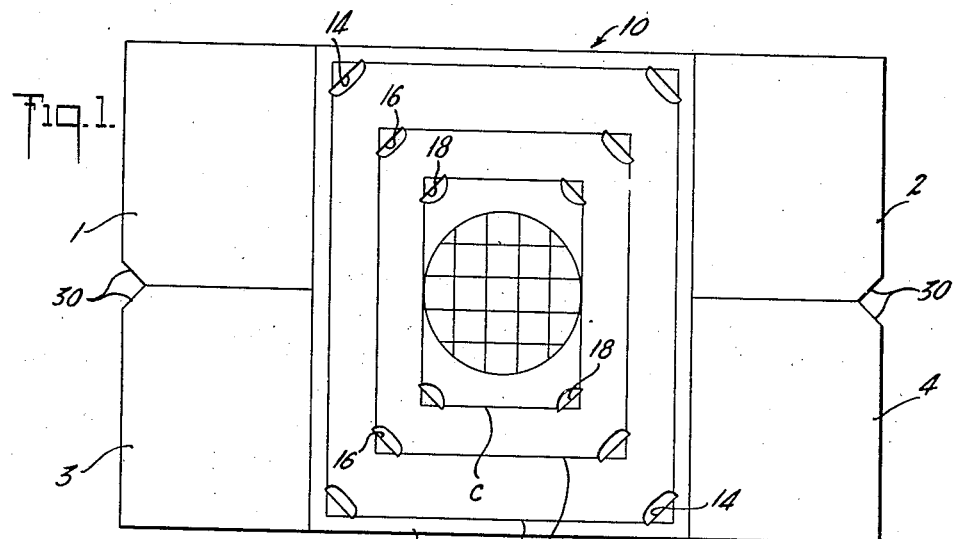
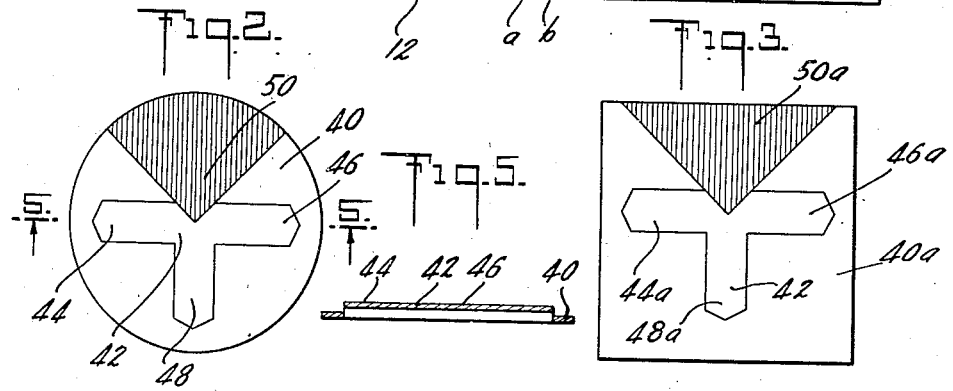
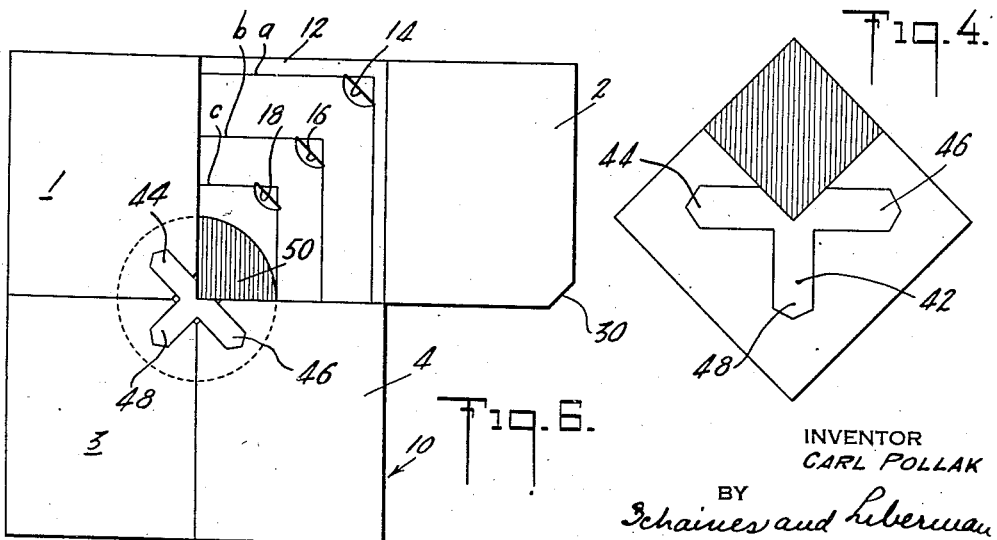
INVENTOR
CARL POLLAK
BY
Schaines and Liberman
ATTORNEYS

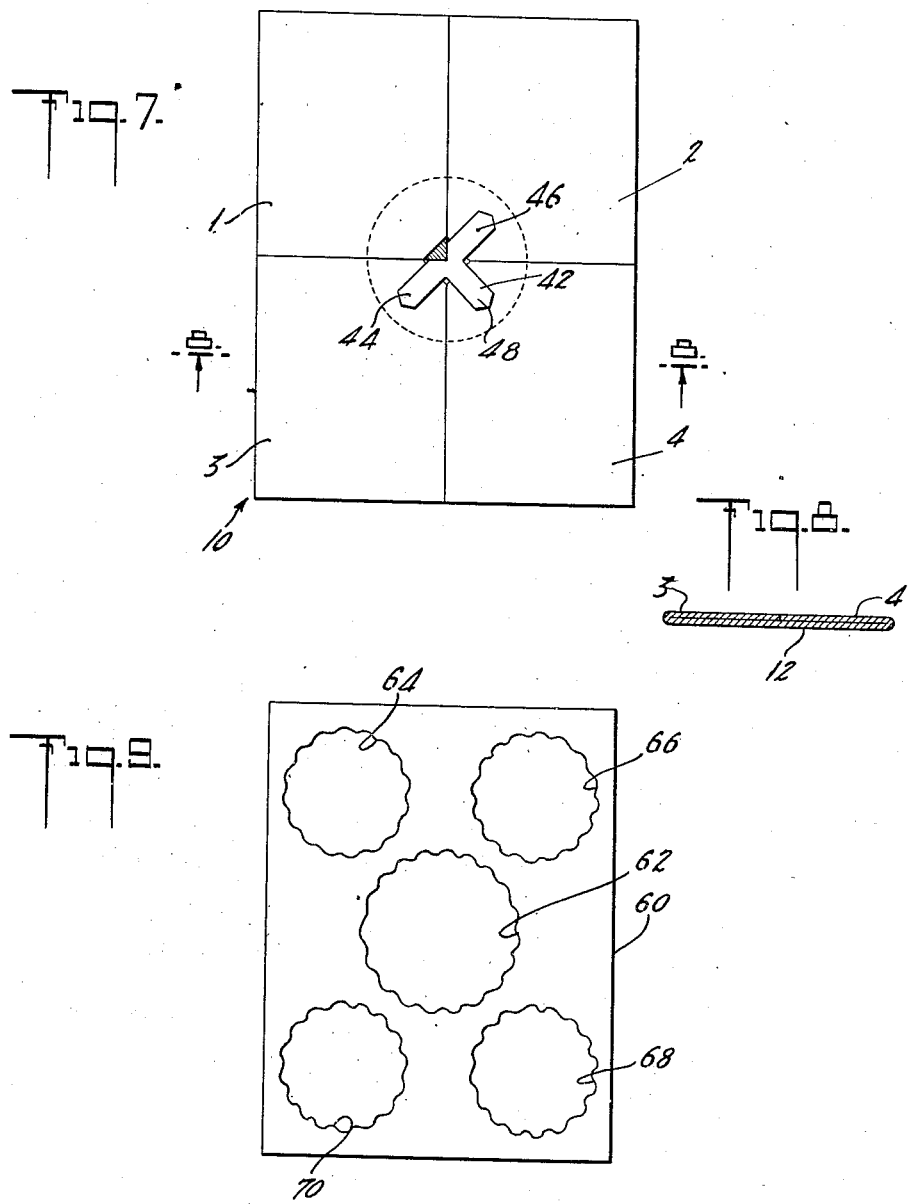

Patented Dec. 10, 1946

2,412,288

UNITED STATES PATENT OFFICE 2,412,288

APPARATUS FOR MAKING MONTAGE PRINTS

Carl Pollak, Forest Hills, N. Y.

Application August 6, 1945, Serial No. 609,170

13 Claims. (Cl. 88—24)

My invention relates generally to photography, and in particular it relates to an apparatus for making montage prints; that is, a plurality of pictures from several negatives on one piece of paper, or a plurality of pictures on one piece of paper from several selected portions of one negative. As used herein, the term "print" may mean either a contact print or an enlargement.

The main object of my invention, is the provision of an apparatus for making montage prints, which apparatus comprises a base member, means to selectively cover certain portions thereof, means to selectively uncover certain other portions thereof, and means to secure the covered portions against uncovering during exposure of the uncovered portions.

Another object of my invention is the provision of an apparatus for making montage prints which comprises a base member, means to locate a sheet of light sensitive paper thereon, a plurality of wing members, and means to lock certain of said wing members over against the base, said locking means being shiftable to permit unlocking of other wing members to expose, successively, selected portions of the light sensitive paper.

Another object of my invention is the provision of a device for making montage prints which comprises a base member, means to mask certain portions thereof and means to mask the center thereof, the center masking means locking certain of the first masking means over against the base while permitting others thereof to be moved away from the base to expose portions of the base.

Another object of my invention is the provision of a device for making montage prints which comprises a base member, a plurality of wing members swingable over against the body to cover same and swingable away from the body to uncover same, a lock to secure certain of said wings over against the body while permitting other wings to be swung away from the body, said lock being shiftable to permit successive locking and unlocking of the wing members, said lock normally covering the center of the base member.

Another object of my invention is the provision of a device for making montage prints which comprises a base portion, a plurality of wing members to mask portions of said base, a lock to selectively secure certain of said wing members in masking position, said lock cooperating with the wings to mask the base.

Other and further objects of my invention will in part be obvious and still others pointed out specifically hereinbelow in connection with the following description of an illustrative embodiment thereof.

In the drawings annexed hereto and forming a part hereof,

Figure 1 is a plan view of one form of device constructed according to and embodying my invention, showing the wing components of my device extended in position uncovering the base;

Fig. 2 is a plan view of one form of wing lock;

Fig. 3 is a plan view of another form of wing lock;

Fig. 4 is a section on the line 4—4 of Figs. 2 and 3;

Fig. 5 is a plan view of a third form of wing lock;

Fig. 6 is a plan view showing my device in operation, the lock holding three of the wing components against the body of the device, one wing swung away from the body to permit exposure of the uncovered portion of the paper;

Fig. 7 is a plan view of my device with all the wing sections folded over against the body;

Fig. 8 is a section on the line 8—8 of Fig. 7; and

Fig. 9 is a plan view of a masking sheet which may be used with the montage device of my invention.

My device, indicated generally by reference numeral 10, comprises a base member 12 of thin, flat, rigid material such as cardboard, fibreboard, light gauge metal, or any other suitable material. Base 12 is rectangular in outline, and while it is to be understood that any dimensions given are merely illustrative and that my device may be made of any desired sizes, one suitable form may be twelve inches wide by fifteen inches long. Some conventional sizes of light-sensitive photographic print paper are 11" x 14", 8" x 10" and 5" x 7", and the formed device described and illustrated herein is of size to accommodate these three papers. It will be obvious, however, that my base member may be made larger than 12" x 15", and that within the scope of my invention other sizes of paper may equally well be accommodated.

On the face of base 12, I form, as by printing or indenting, a plurality of rectangular outlines $a$, $b$, and $c$, each outline being the same size as a conventional sheet of photographic paper. I provide means on base 12 to properly locate the various sizes of paper, these means comprising angulated openings 14, 14, 16, 16, and 18, 18, across each corner of outlines $a$, $b$, and $c$ respectively. In practice, when using a sheet of paper of size $a$ (11" x 14"), the corners thereof would be inserted into openings 14; the corners of paper size $b$ (8" x 10") would be inserted into openings 16, and the corners of paper size $c$ (5" x 7") would be inserted into openings 18.

On the opposite sides of base 12, I provide a pair of wing members either integral with base 12, or pivotally secured thereto, and preferably of the same material as base 12; wings 1 and 3 disposed along one side of base 12, and wings 2 and 4 along the opposite side. As seen in Fig. 1, each wing is half the width and half the length of base 12. The inner corner of each of the wings 1, 2, 3, and 4 is cut away, as at 30, 30 for reasons to be developed below. Each of the wings may be individually actuated to swing outwardly and away from body 12 as in Fig. 1, or to be swung over against base 12, to overlie a portion thereof, as in Fig. 6, where wings 1, 3 and 4 overlie the base 12, as in Fig. 6, where wings 1, 3, and 4 overlie the base, with wing 2 swung outwardly therefrom, uncovering a quarter of the base.

As a part of my apparatus, I provide means to releasably secure the wings over against base 12, one form of securement being illustrated in Fig. 2, comprising a circular disc 40 of cardboard or the like material. I partially outline from the body of disc 40, as by stamping or scoring or otherwise, a T-shaped member 42, having aligned arms 44, 46 and a right angled leg 48. Arms 44, 46 and leg 48 are separable and movable upwardly of the body of the disc, but T—42 is integral with the body of disc 40 as indicated generally at 50, permitting the arms and leg of the T-member to be raised slightly above the level or plane of the disc. As shown in Fig. 2, a quadrant of disc 40 may be colored to distinguish same from the body thereof, the quadrant coloring extending from the center of the disc to the margins thereof, opposite to and in line with leg 48. It is to be understood that the colored portion is integral with the body of the disc.

The form of lock shown in Fig. 3 is identical with that of Fig. 2, except that the body 40a is square in outline, and the quadrant 50a thereof is formed from the center towards the straight side remote from leg 48a. The form of lock of Fig. 4 is identical with that of Fig. 3 except that the T-member is 45° turned from the position of the T-member in Fig. 3, and the marginal lines of quadrant 50b each go to a side, forming a square. These different forms of locks are used when it is desired to obtain different effects: The lock of Fig. 2 is used when it is desired to have a circular print in the center of the sheet of paper to be treated. When a square is desired in the center of the sheet, the lock shown in Fig. 4 is used, and when a diamond is desired, the lock of Fig. 3 is used.

My device, therefore, as above described, comprises the base member 12, wings 1, 2, 3 and 4, and a wing lock 40 (or 40a, or 40b), although various accessories may conveniently or desirably be used therewith; these accessories forming no part of my invention. In use, lock 40 is disposed atop the center of the light sensitive paper being treated, and three of the four wings fitted in and under arms 44, 46 and leg 48. If desired, one, two or three wings may be locked, and the unlocked wings may be swung away from the base to permit light to impinge upon the uncovered portions of the paper disposed on the base member. As will be obvious, my montage device permits a wide latitude of arrangement, in permitting but one or all but one of the wings to be locked during a single exposure.

In using my device to make, for example, a five picture montage print with a picture of circular outline in the center thereof, lock 40 is used. When a square outline picture is desired in the center of the montage, lock 40b is used, and when a diamond-shaped picture is desired in the center of the montage, lock 40a is used. A piece of light sensitive paper is inserted into base 12, the corners fitted into the angulated openings. If the paper is of size 11" x 14", the corners are fitted into openings 14, 14. Lock 40 is disposed atop the paper, on the center thereof, and wings 1, 3 and 4 swung over against the body and under arm 44, leg 48 and arm 46 respectively. Wing 2 is permitted to remain in outswung position, leaving the upper right hand corner of the light sensitive paper uncovered, except for the portion thereof masked off by the exposed part of circular disc 40. Light is then projected through the desired negative onto the exposed portion of the paper. After a sufficient exposure has been given to the paper, wing 2 is swung over onto the exposed portion of the paper, atop quadrant 50 on disc 40. Leg 48 of T-member 40 is then swung ninety degrees (either to the right or to the left), turning the entire lock 40 through the same arc. If swung to the right, arm 46 projecting upwardly of disc 40 will ride over and onto wing 2, arm 44 will ride over and onto wing 3, and leg 48 will ride over and onto wing 4. This ninety degree turn thus serves to unlock one wing, 1, while locking the three other wings, 2, 3 and 4, over against the paper secured atop base 12. The upper left hand portion of the light sensitive sheet may be exposed to light shining through a second negative, or a different portion of the first negative.

If leg 48 is swung to the left, wings 2, 1 and 3 will be locked and wing 4 unlocked, to permit the making of an exposure onto the lower right hand portion of the light-sensitive sheet. In like manner, as will be obvious, all four portions of the light-sensitive sheet may be exposed. When this has been done, all the wing portions are swung away from the body, and the lock 40 removed. A masking sheet (not shown) having a circular opening in the center thereof corresponding to size of the lock, may then be disposed atop the light-sensitive sheet and the fifth and final exposure made onto that portion of the paper. When the sheet is developed, a five picture montage will result; a circular outline picture in the center, and four pictures in the corners thereof. If mask 40a is used, the same five picture montage will be secured, but the center picture will be diamond shaped, and if mask 40b is used, the same five picture montage will be secured, with the center picture of square shape.

If it is desired to make a montage whereon the several pictures are separated, a mask sheet as 60 may be used, this mask having circular openings 64, 66, 68 and 70 in the corners thereof, and having a circular opening 62 in the center thereof, of size equal to the size of the mark. Other masking sheets, having differently shaped openings, may also be employed as desired.

With my device, as above described, it is possible to make montage prints easily and quickly. The lock serves to secure against the light any but that particular portion of the light-sensitive sheet it is desired to be worked, and the shiftability of the lock permits very wide latitude in making any arrangement desired.

My device may be made easily and quickly of relatively inexpensive materials, and its operation is simplicity itself.

Having now described my invention, what I claim and desire to secure by Letters Patent is:

1. A device of the character described comprising a base member, a plurality of wing members secured to the marginal edges of said base for movement over and against said base and away therefrom, each of said wing members covering a separate area of the base when disposed thereover, and lock means covering a portion of the base adjacent the inner corners of the wing members to engage and hold certain of said wing members over and covering certain areas of said base while permitting others thereof to be moved away from and uncovering certain other areas of said base.

2. A device of the character described comprising a base member, means to locate on said base a sheet of light-sensitive material, a plurality of wing members secured to the marginal edges of said base for movement over and covering said base and material and away therefrom to uncover the base and material, each of said wing members covering a separate area of the base when disposed thereover, and lock means covering a portion of said base adjacent the inner corners of the wing members to successively engage and hold certain of said wings over and covering selected portions of said base while permitting others thereof to be moved away from to uncover other areas of said base and material thereon.

3. A device of the character described comprising a base member, means to locate a sheet of light-sensitive material thereon comprising a plurality of angulated slits, a plurality of wing members secured to the marginal edges of said base for movement over said base and away therefrom, each of said wing members covering a separate area of the base when disposed thereover, and lock means overlying a portion of the base adjacent the inner corners of the wing members to successively engage and hold one or more of said wings over and covering selected areas of said base while permitting one or more thereof to be moved away from and to uncover other and selected areas of said base to prevent access of light to the covered area while permitting access of light to the uncovered area.

4. A device of the character described comprising a rectangular base member, a plurality of wing members hingedly secured to the marginal edges of said base for movement over and against said base and away therefrom, and lock means covering a central portion of the base adjacent the inner corners of the wing members to selectively engage and hold certain of said wings over and covering certain areas of said base while permitting others thereof to be moved away from and uncovering other areas of said base.

5. A device of the character described comprising a rectangular base member, a plurality of wing members hingedly secured to the marginal edges of said base for movement over and against said base and away therefrom, each wing member covering a separate area of the base when disposed thereover, and a lock overlying a portion of the base adjacent the inner corners of the wing members to selectively engage and hold certain of said wings over portions of said base while permitting others thereof to be moved away from and uncovering other portions of said base, said lock comprising a disc covering the portion of the base adjacent the inner corners of the wings, the disc having a plurality of fingers extending upwardly and laterally of the plane of the disc, said fingers overlying certain of the wings to hold them against the base.

6. A device of the character described comprising a rectangular base member, a plurality of wing members hingedly secured to the marginal edges of said base for movement over and covering said base and away therefrom, each wing member covering a separate area of the base when disposed thereover, and a lock to selectively engage and hold certain of said wings over certain areas of said base while permitting others thereof to be moved away from and uncovering other areas of said base, said lock comprising a disc covering a portion of the base adjacent the inner corners of the wing members and having a plurality of fingers in number less by one than the number of wings, said fingers normally extending upwardly of the plane of the disc and laterally thereof, said fingers engaging and holding all of the wings but one over and against the base to permit the uncovering of one separate area thereof, said disc being rotatable to release successively another wing and permit another separate area of the base to be uncovered while holding the remaining wings over and against and covering the remaining areas of the base.

7. A device as in claim 1, in which the wing members, when disposed over and against the base, extend inwardly from the marginal edges of the base short of the center of the base, the center of the base being covered by the lock.

8. A device as in claim 1, in which the wing members, when disposed over and against the base, extend inwardly from the marginal edges of the base short of the center of the base, the center of the base being covered by the lock, the lock comprising a flat circular disc.

9. A device as in claim 1, in which the wing members, when disposed over and against the base, extend inwardly from the marginal edges of the base short of the center of the base, the center of the base being covered by the lock, the lock comprising a square disc.

10. A device as in claim 6, in which the wing members, when disposed over and against the base member, extend inwardly from the marginal edges thereof short of the center of the base, the center of the base being covered by the lock disc, and in inner ends of the wings overlying the edges of the lock disc.

11. A device as in claim 6, in which the wing members, when disposed over and against the base member, extend inwardly from the marginal edges thereof short of the center of the base, the center of the base being covered by the lock disc, and in inner ends of the wings overlying the edges of the lock disc, the lock comprising a flat, circular disc.

12. A device as in claim 6 in which the wing members, when disposed over and against the base member, extend inwardly from the marginal edges thereof short of the center of the base, the center of the base being covered by the lock disc, and in inner ends of the wings overlying the edges of the lock disc, the lock comprising a flat square disc, the finger elements being normal to the marginal edges thereof.

13. A device as in claim 6, in which the wing members, when disposed over and against the base member, extend inwardly from the marginal edges thereof short of the center of the base, the center of the base being covered by the lock disc, and in inner ends of the wings overlying the edges of the lock disc, the lock comprising a flat, square disc, the finger elements extending substantially along the diagonals of the square.

CARL POLLAK.